US008837173B2

(12) United States Patent
Huang et al.

(10) Patent No.: US 8,837,173 B2
(45) Date of Patent: Sep. 16, 2014

(54) DC TO DC POWER CONVERTING DEVICE

(71) Applicant: Chicony Power Technology Co., Ltd., New Taipei (TW)

(72) Inventors: Wen-Nan Huang, New Taipei (TW); Shiu-Hui Lee, New Taipei (TW); Gen-Zen Liu, New Taipei (TW); Yao-Wen Tsai, New Taipei (TW); Chih-Ching Huang, New Taipei (TW)

(73) Assignee: Chicony Power Technology Co., Ltd, New Taipei (TW)

( * ) Notice: Subject to any disclaimer, the term of this patent is extended or adjusted under 35 U.S.C. 154(b) by 0 days.

(21) Appl. No.: 13/732,766

(22) Filed: Jan. 2, 2013

(65) Prior Publication Data

US 2014/0185330 A1    Jul. 3, 2014

(51) Int. Cl.
*H02M 3/335* (2006.01)

(52) U.S. Cl.
CPC ................. *H02M 3/33523* (2013.01)
USPC ...................................................... 363/21.02

(58) Field of Classification Search
USPC .......................... 363/21.02, 21.03, 17, 98, 132
See application file for complete search history.

(56) References Cited

U.S. PATENT DOCUMENTS 4,853,598 A * 8/1989 Kusko et al. ................. 315/101
5,864,472 A * 1/1999 Peterson ........................ 363/18

8,339,813 B2 * 12/2012 Wang et al. ................ 363/21.02
8,525,428 B2 * 9/2013 Chen et al. ..................... 315/219
2012/0250358 A1 * 10/2012 Jin et al. ........................... 363/17
2013/0163290 A1 * 6/2013 Moon et al. ................ 363/21.02

FOREIGN PATENT DOCUMENTS

| CN | 1756060 A | 4/2006 |
| CN | 101951036 A | 1/2011 |
| TW | M292206 U | 6/2006 |
| TW | 201041287 A1 | 11/2010 |
| TW | 201201492 A | 1/2012 |

\* cited by examiner

*Primary Examiner* — Adolf Berhane
*Assistant Examiner* — Gary Nash
(74) *Attorney, Agent, or Firm* — Muncy, Geissler, Olds & Lowe, P.C.

(57) ABSTRACT

A power converting device includes a switching unit, a resonant unit, a converting unit, a rectifying and filtering unit, an inductance-sensing unit, and a driver. The resonant unit is electrically connected to the switching unit and includes a resonant capacitor, a resonant inductor, and a variable magnetizing-inductor having at least two inductances, the resonant inductor is electrically connected to the resonant capacitor and the variable magnetizing-inductor. The converting unit is electrically connected to the resonant unit. The rectifying and filtering unit is electrically connected to the converting unit. The inductance-sensing unit is electrically connected to the rectifying and filtering unit, the inductance-sensing unit instantaneously senses inductances of the variable magnetizing-inductor. The driver is electrically connected to the inductance-sensing unit and the switching unit, the driver is configured for controlling a switching frequency of the switching unit according to an inductance instantaneously sensed by the inductance-sensing unit.

6 Claims, 5 Drawing Sheets

DC TO DC POWER CONVERTING DEVICE

BACKGROUND OF THE INVENTION

1. Field of the Invention

The present invention relates to a power converting device, and in particular to a DC to DC power converter which can improve light-load efficiency.

2. Description of Related Art

In electronic engineering, a DC-to-DC converter is an electronic circuit which converts a source of direct current (DC) from one voltage lever to another, and the converted DC voltage is stabilized at a preset voltage value. Generally speaking, the DC-to-DC converter is divided into two categories: one is "step-down" DC-to-DC converter (namely, the output voltage is lower than the input voltage), and other one is "step-up" DC-to-DC converter (namely, the output voltage is lower than the input voltage). The DC-to-DC converter is mainly applied to a distributed power system. Hence, the DC voltage of the previous stage is fixed, and the DC voltage level of the next stage can be connected to the corresponding DC-to-DC converter according to the required power.

More particularly, the DC-to-DC converter can be separated into two categories: the pulse width modulation (PWM) converter and the resonant converter. The hard-switching operation of the PWM converter introduces the high switching losses and the poor efficiency. Accordingly, the soft-switching technology has been developed for the resonant converter to reduce the switching losses and increase the efficiency.

The DC characteristic of the resonant converter could be divided into ZVS (zero-voltage switching) region and ZCS (zero-current switching) region. Accordingly, the resonant circuit structure is adopted in high-efficiency and high-power power circuits.

Reference is made to FIG. 1, which is a circuit diagram of a conventional power converting device. The power converting device includes two switching elements Q1 and Q2, a first capacitor C1, a second capacitor C2, a first inductor L1, a second inductor L2, a first diode D1, a second diode D2, a transistor T1, and a controller 50. The switching elements Q1 and Q2 collectively construct a switching circuit to convert a direct current (DC) power source VIN into a pulsating signal. The pulsating signal then is transmitted to a resonant tank constructed by the first capacitor C1, the first inductor L1 and the second inductor L2 for generating resonant. After that, the signal is transmitted to a secondary side of the transistor T1, and then is converted into another DC power source with a voltage magnitude different from the DC power source VIN by the first diode D1, the second diode D2, and the second capacitor C2.

Reference is made to FIG. 2, which graphically represents inductances of second inductor versus current for the power converting device of FIG. 1. As shown in FIG. 2, in an unsaturated condition, the inductances of second inductor L2 are substantially fixed, thus the switching frequency of the switching elements Q1, Q2 is increased for stabilizing the output voltage when the power converting device is operated under light-load condition. However, the light-load efficiency of the power converting device is growing worse when the switching frequency is increased, as shown in FIG. 3. In FIG. 3, dotted line shows the frequency response of the power converting device under heavy-load condition, and solid line shows the frequency response of the power converting device under light-load condition.

SUMMARY OF THE INVENTION

It is an object of the present invention to provide a power converting device which can improve light-load efficiency.

Accordingly, a power converting device according to one aspect of the present invention comprises a switching unit, a resonant unit, a converting unit, a rectifying and filtering unit, an inductance-sensing unit, and a driver. The resonant unit is electrically connected to the switching unit and comprises a resonant capacitor, a resonant inductor, and a variable magnetizing-inductor having at least two inductances, the resonant inductor is electrically connected to the resonant capacitor and the variable magnetizing-inductor. The converting unit is electrically connected to the resonant unit. The rectifying and filtering unit is electrically connected to the converting unit. The inductance-sensing unit is electrically connected to the rectifying and filtering unit. The inductance-sensing unit instantaneously senses inductances of the variable magnetizing-inductor. The driver is electrically connected to the inductance-sensing unit and the switching unit. The driver is configured for controlling a switching frequency of the switching unit according to an inductance instantaneously sensed by the inductance-sensing unit.

By using the inductance-sensing unit 150 instantaneously senses the inductance of the variable magnetizing-inductor Lm having at least two inductances, and transmits the inductance to the controller 160 for calculating corresponding switching frequency of the switching unit 110 driven by the driving unit 170, the switching loss of the switching unit 110 can be reduced, hence the light-load efficiency of the power converting device 10 can be improved.

BRIEF DESCRIPTION OF DRAWING

The features of the invention believed to be novel are set forth with particularity in the appended claims. The invention itself, however, may be best understood by reference to the following detailed description of the invention, which describes an exemplary embodiment of the invention, taken in conjunction with the accompanying drawings, in which:

DETAILED DESCRIPTION OF THE INVENTION

A preferred embodiment of the present invention will be described with reference to the drawings.

Figure 1:
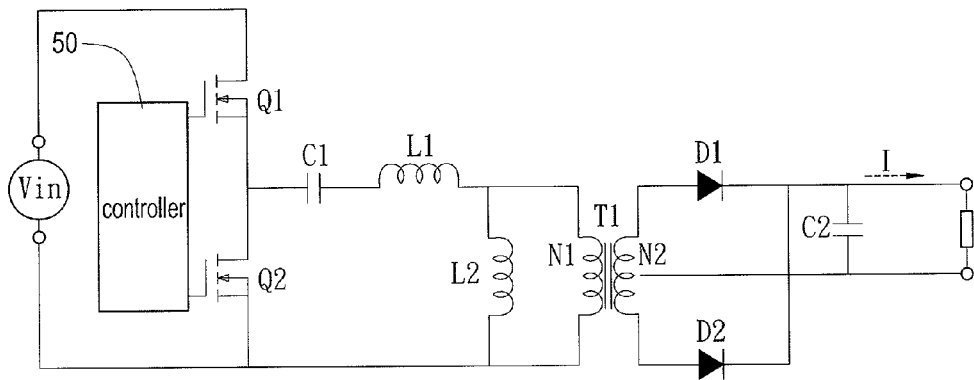
FIG. 1 is a circuit diagram of a conventional power converting device.
Figure 2:
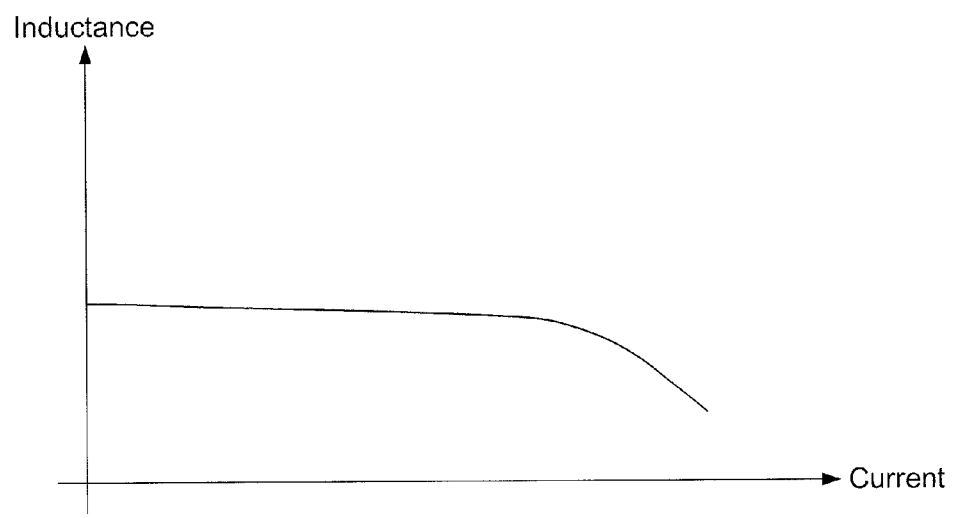
FIG. 2 graphically represents inductances of second inductor versus current for the power converting device of FIG. 1.
Figure 3:
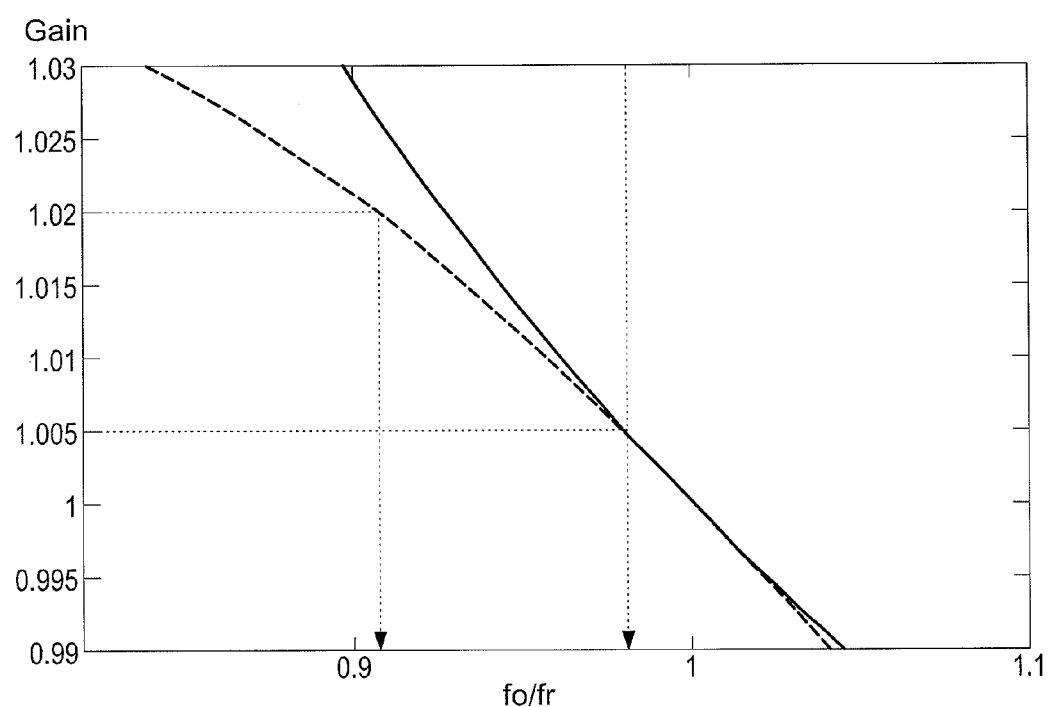
FIG. 3 shows frequency response characteristics of the conventional power converting device.
Figure 4:
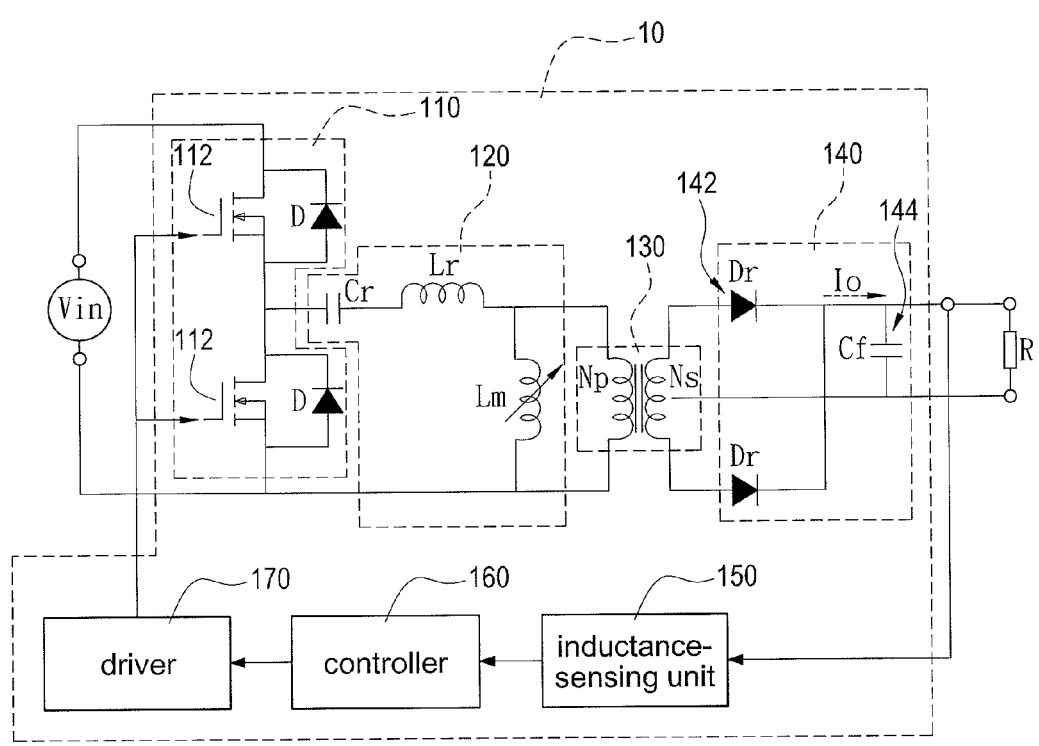
FIG. 4 is a circuit diagram of a power converting device according to the present invention.

Reference is made to FIG. 4, which is a circuit diagram of a power converting device according to the present invention. The power converting device 10 is used for converting voltage magnitude of an inputted direct current (DC) power source VIN. The converted DC voltage is stabilized at a preset voltage value, and is outputted to a load R. The converting manner of the power converting device 10 includes boost or buck voltage of the DC power source VIN. The power converting device 10 includes a switching unit 110, a resonant unit 120, a converting unit 130, a rectifying and filtering unit 140, an inductor sensing unit 150, a controller 160, and a driver 170.

The switching unit 110, including a plurality of switching elements 112 and a plurality of diodes D, is electrically connected to the DC power source VIN and the driver 170 to convert the DC power source VIN into two different voltage magnitudes of a pulsating signal. The amount of the diodes D is the same as that of the switching elements 112. In this embodiment, the switching unit 110 is a half-bridge circuit which is composed of two switching elements 112 electrically connected in series. Each switching element 112 is (but not limited to) a metal-oxide-semiconductor field-effect transistor (MOSFET), and each diode D is connected between the drain terminal and the source terminal of each MOSFET. However, each diode D can also be parasitic diode of each MOSFET. In the practical application, however, the switching unit 110 can be full-bridge circuit, and each switching element 112 can be replaced by other power switches with switching function, such as insulated bipolar transistor (IGBT). Each switching element 112 is electrically connected to the driver 170 and is alternatively turned on and off for generating the pulsating signal.

The resonant unit 120 is electrically connected to the switching unit 110 and located between the switching elements 112 to receive the pulsating signal. The resonant unit 120 includes a resonant capacitor Cr, a resonant inductor Lr, and a variable magnetizing-inductor Lm. The resonant capacitor Cr and the resonant inductor Lr electrically connected in series are electrically connected to a primary winding Np of the converting unit 130 in series. The variable magnetizing-inductor Lm is electrically connected to the primary winding Np and the resonant inductor Lr. In particularly, the variable magnetizing-inductor Lm is electrically connected to the primary winding Np of the converting unit 130 in parallel. The resonant capacitor Cr is not only used for blocking DC component of the pulsating signal, but constructing a resonant tank with the resonant inductor Lr and the variable magnetizing-inductor Lm. The variable magnetizing-inductor Lm can be an external inductor, as shown in FIG. 4, however, the variable magnetizing-inductor Lm can also be magnetizing inductance of the converting unit 130.

Figure 6:
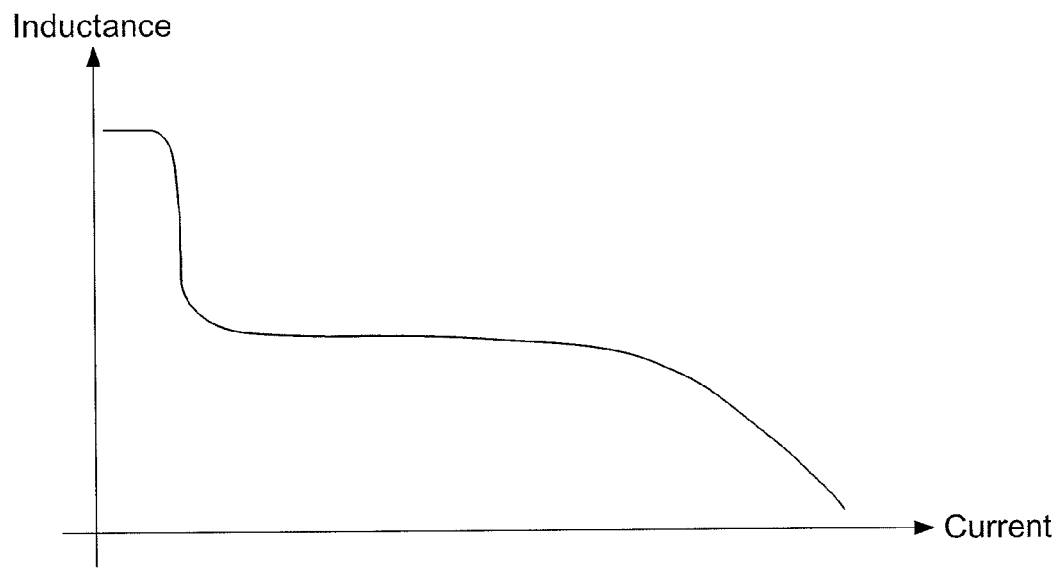
FIG. 6 graphically represents inductances of variable magnetizing-inductor versus current for the power converting device of FIG. 3.

The variable magnetizing-inductor Lm has at least two inductances, as shown in FIG. 6. In particularly, the variable magnetizing-inductor Lm has a first inductance and a second inductance, the first inductance is higher than the second inductance, namely, the first inductance is a relatively high inductance and the second inductance is a relatively low inductance. When the power converting device 10 is operated under light-load condition (namely, the power converting device 10 is in small current operation), the variable magnetizing-inductor Lm has relatively high inductance (first inductance), and when the power converting device 10 is operated under heavy-load condition (namely, the power converting device 10 is in large current operation), the variable magnetizing-inductor Lm has relatively low inductance (second inductance). However, in the practical application, the variable magnetizing-inductor Lm can have more than two inductances.

With referred again to FIG. 4, the converting unit 130 is electrically connected to the resonant unit 120 and includes the primary winding Np and a secondary winding Ns. The primary winding Np converts electric energy into magnetic energy, and then conducting the magnetic energy to the secondary winding Ns. The secondary winding Ns convers the magnetic energy into electric energy, and achieve the task of stepping-up or stepping-down voltage magnitude. In this embodiment, the converting unit 130 is a center-tapped converter.

The rectifying and filtering unit 140, including a rectifying circuit 142 and a filtering circuit 144, is electrically connected to the converting unit 130. The rectifying unit 142, including two rectifying diodes Dr, is electrically connected to the secondary winding Ns, such that a full-bridge rectifying circuit is formed to convert alternative current (AC) power source into DC current power source with high-frequency ripple component. The filtering circuit 144, including a filtering capacitor Cf, filters the high-frequency ripple component, and then a stable DC power source with a voltage magnitude different from the DC power source VIN is outputted from the power converting device 10. The filtering capacitor Cf is electrically connected to the rectifying diodes Dr and across the load R.

The inductance-sensing unit 150 is electrically connected to the rectifying and filtering unit 140. The inductance-sensing unit is instantaneously sensing inductances of the variable magnetizing-inductor Lm.

The controller 160 is electrically connected to the inductance-sensing unit 150. The controller 160 calculates a switching frequency value according to an inductance instantaneously sensed by the inductance-sensing unit 150, and then transmits the switching frequency value to the driver 170 electrically connected to the controller 160. The driver 170 is electrically connected to the controller 160 and switching unit 110. The driver 170 is configured for controlling a switching frequency of the switching unit 110 according to an inductance instantaneously sensed by the inductance-sensing unit 150. The driver 170 alternatively turns the switching elements 112 on and off in synchronization with the switching frequency value. In this embodiment, the inductance-sensing unit 150, the controller 160 and the driver 170 are implemented as different units, as shown in FIG. 4. However, in the practical application, the inductance-sensing unit 150, the controller 160 and the driver 170 can be integrated into an integrated circuit (IC).

Figure 5:
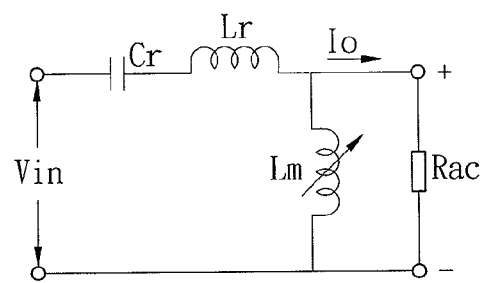
FIG. 5 is an equivalent circuit for the power converting device shown in FIG. 4.

Reference is made to FIG. 5, which is an equivalent circuit for the power converting device shown in FIG. 4. In FIG. 5, an equivalent load impedance Rac is an impedance which is equivalent load of secondary side (where the secondary winding Ns is disposed) of the converting unit 130 to the primary side (where the primary winding Np is disposed) of the converting unit 130, and an outputting current Io is a current flowing through the equivalent load impedance Rac.

Analysis of the circuit in FIG. 5, and hence the voltage gain of the power converting device 10 is given by $$G = \frac{Vo}{Vi} = \frac{1}{\sqrt{\left\{1 + \frac{1}{K}\left[1 - \left(\frac{1}{F}\right)^2\right]\right\}^2 + \left[\left(F - \frac{1}{F}\right)Q\right]^2}}$$

The value F is obtained from $$F = \frac{fs}{fr}$$

Where fs is switching frequency, fr is resonant frequency
The value K is obtained from $$K = \frac{Lm}{Lr}$$

Furthermore, the value of Δfs can be determined from Δfs=fs−fs$_o$
The value of the ΔLm can be determined from ΔLm=Lm−Lm$_o$ Thus $$\Delta Lm = -Lm_o - \frac{Lr\left[\frac{fr^2}{(fs_o+\Delta fs)^2}-1\right]}{\sqrt{\frac{1}{G^2}-Q^2\left(\frac{fr}{fs_o+\Delta fs}-\frac{fs_o+\Delta fs}{fr}\right)^2}-1}$$

Figure 7:
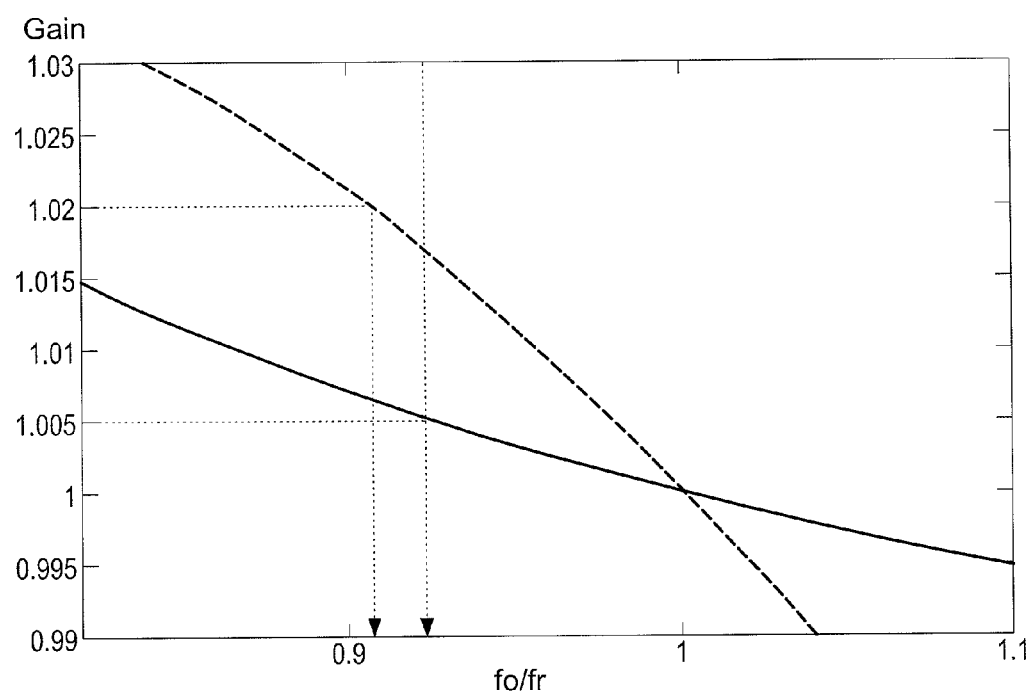
FIG. 7 shows frequency response characteristics of the power converting device of the present invention.

Reference is made to FIG. 7, which shows frequency response of the power converting device according to the present invention. In FIG. 7, dotted line shows the frequency response of the power converting device 10 under heavy-load condition, and solid line shows the frequency response of the power converting device 10 under light-load condition. Because of the variable magnetizing-inductor Lm has at least two inductances respectively applied in light-load operation and heavy-load operation, the switching loss of the switching elements 112 under light-load condition can be reduced, thus the light-load efficiency of the power converting device 10 can be improved.

To sum up, by using the inductance-sensing unit 150 instantaneously senses the inductance of the variable magnetizing-inductor Lm which has at least two inductances, and transmits the inductance to the controller 160 for calculating corresponding switching frequency of the switching unit 110 driven by the driving unit 170, the switching loss of the switching unit 110 can be reduced, hence the light-load efficiency of the power converting device 10 can be improved.

Although the present invention has been described with reference to the foregoing preferred embodiment, it will be understood that the invention is not limited to the details thereof. Various equivalent variations and modifications can still occur to those skilled in this art in view of the teachings of the present invention. Thus, all such variations and equivalent modifications are also embraced within the scope of the invention as defined in the appended claims.

What is claimed is:

1. A power converting device includes:
a switching unit;
a resonant unit electrically connected to the switching unit and including a resonant capacitor, a resonant inductor, and a variable magnetizing-inductor having at least two inductances, the resonant inductor electrically connected to the resonant capacitor and the variable magnetizing-inductor;
a converting unit electrically connected to the resonant unit;
a rectifying and filtering unit electrically connected to the converting unit;
an inductance-sensing unit electrically connected to the rectifying and filtering unit, the inductance-sensing unit instantaneously sensing inductances of the variable magnetizing-inductor;
a driver electrically connected to the inductance-sensing unit and the switching unit, the driver configured for controlling a switching frequency of the switching unit according to an inductance instantaneously sensed by the inductance-sensing unit; and
a controller electrically connected to the inductance-sensing unit and the driver, the controller calculates the switching frequency value according to the inductance instantaneously sensed by and outputted from the inductance-sensing unit, and transmits the switching frequency value to the driver,
wherein the variable magnetizing-inductor has a first inductance under light-load condition and a second inductance under heavy-load condition, the first inductance is larger than the second inductance.

2. The power converting device in claim 1, wherein the rectifying and filtering unit includes a rectifying circuit and a filtering circuit, the rectifying circuit is electrically connected to a secondary winding of the converting unit, and the filtering circuit is electrically connected to the rectifying circuit.

3. The power converting device in claim 1, wherein the switching unit includes at least two switching elements, and the driver is electrically connected to each switching element.

4. The power converting device in claim 3, further comprising two diodes, each diode is electrically connected to each switching unit in parallel.

5. The power converting unit in claim 1, wherein the resonant capacitor, the resonant inductor are electrically connected to a primary winding of the converting unit in series, the variable magnetizing-inductor is electrically connected to the primary winding in parallel.

6. The power converting device in claim 1, wherein the converting unit is a center-tapped converter.

\* \* \* \* \*